United States Patent Office 3,729,439
Patented Apr. 24, 1973

---

3,729,439
ENTROPICALLY STABILIZED WATER BASE DISPERSIONS
Fred W. Parker, Flint, Mich., assignor to E. I. du Pont de Nemours and Company, Wilmington, Del.
No Drawing. Filed Apr. 30, 1971, Ser. No. 139,203
Int. Cl. C08f 15/40, 37/00
U.S. Cl. 260—29.7 W          10 Claims

ABSTRACT OF THE DISCLOSURE

Graft copolymers having graft segments which contain hydroxy terminated acrylic monomers which enable the copolymer to form water base dispersions.

BACKGROUND OF THE INVENTION

In an era of ecological concern, a water base finishing composition would have obvious merit. Typical finishes are organosol dispersions wherein a copolymer is dispersed in an organic medium. This medium commonly may contribute volatile solvents to the atmosphere. Attempts to produce water base dispersions have proven unsuccessful for a number of reasons such as polymer kickout, poor spray application, poor reflow thermosetting characteristics, low solids, content and the like.

SUMMARY OF THE INVENTION

This invention relates to graft copolymers which form dispersions in a water base medium which are subsequently referred to as aquasols. The graft segment of the graft copolymer must contain water soluble hydroxylated acrylic monomers. The graft copolymers of this invention are entropically stabilized and have the unique capability of reversibility changing from a solution phase to a dispersion upon the addition of water. Water miscible organic solvents can be used to reconvert the dispersion back to a solution.

DESCRIPTION OF THE INVENTION

The synthetic organic copolymer used in the compositions of the invention is a graft copolymer. These graft copolymers can be represented by the recurring unit structure A–B, where A is the backbone segment of the molecule and B is a graft segment, attached to A by a chemical bond.

The A portion of the molecule can be further represented by an a-b structure, i.e., the backbone is a copolymer composed of monomer units (a) and monomer units (b), where the (a) portion, i.e. the (a) monomer units, of the A segment is composed of monomer units from monomers of the general structure Formula 1

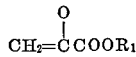

where R is H, CH$_3$ or —CH$_2$CH$_3$, and R$_1$ is an alkyl or cycloalkyl group of 1 through 18 carbon atoms.

These monomers are esters of acrylic acid, methacrylic acid and ethacrylic acid. Lower alkyl methacrylates, wherein the alkyl group has 1 through 4 carbons, such as methyl methacrylate, are especially preferred.

The (a) portion should constitute at least 85% by weight of the total A segment.

Although ordinarily the (a) portion will be composed entirely of these acrylic units referred to above, up to about 50% of its weight can consist of other monomers which do not contribute active grafting sites to the backbone. Illustrative of these are acrylic acid, methacrylic acid and their amides and nitriles; vinyl acetate; styrene; alpha methyl styrene; vinyl toluene, 3-(2-methacryloxy-ethyl)-2,2-spirocyclohexyl-oxazolidine, and the like.

The (b) portion, i.e. the monomer units (b), of the A backbone segment provides the potential active grafting sites, i.e. points for attachment for the B branch segment or segments.

The (b) portion of the A segment, which comprises up to 15%, preferably 0.2–5%, even more preferably 0.4–3%, by weight of the total A segment, can be any monomer units that provide available active grafting sites for graft polymerization. Representative of useful grafting site monomer units are those having the following general formula:

Formula 2

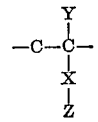

where X is

(the carbon atom in this group being attached directly to the backbone), —O—, or

Y is hydrogen, —CH$_3$ or —CH$_2$CH$_3$;

Z is

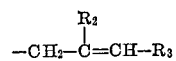

where R$_2$ and R$_3$ are Y

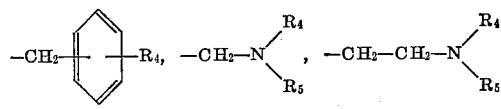

where R$_4$ and R$_5$ are H or alkyl of 1 through 4 carbon atoms, or —CH$_2$—CH$_2$—O—R$_6$ where R$_6$ is alkyl of 1 through 4 carbon atoms;

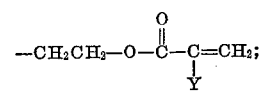

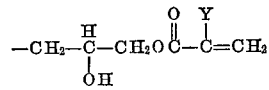

where Y has the same meaning as above;

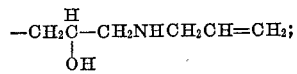

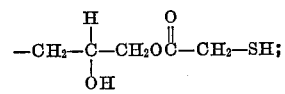

or

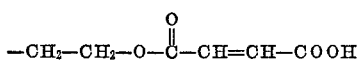

provided that when X is

Z is —H or —NH—$CH_2$—CH=$CH_2$ and provided further that the combined —X—Z group is

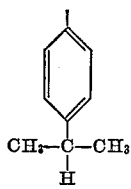

Allyl methacrylate and diethylaminoethyl methacrylate are preferred.

The A segment or backbone comprises from 60–90% by weight of the total A–B graft copolymer, preferably 70–80%. It will have a number average molecular weight of 10,000 to 200,000. Particular advantages are obtained especially when the water dispersion is used as a coating composition, when the backbone segment is at least about 60% by weight of the total graft copolymer. Best results in automotive finish applications are obtained when the backbone segment is at least about 70% by weight of the total graft copolymer in order to minimize water sensitivity.

The B segment is the branch segment or branch segments of the graft copolymer. The B segment of the graft copolymer molecule can be partially composed of monomer units from monomers of the general structure of Formula 1 above.

The B segment must contain water miscible or water soluble hydroxylated acrylic monomers. Illustrative of such water soluble monomers are hydroxyethyl acrylate, hydroxyethyl methacrylate, hydroxypropyl methacrylate, hydroxypropyl acrylate, hydroxybutyl acrylate, and hydroxybutyl methacrylate. These hydroxy terminated monomers can comprise from 70–100% of the B segment. There should be a sufficient amount of hydroxy terminated monomers in the graft segment in order that from about 7 to 40% by weight of the total graft copolymer is hydroxy acrylic monomers, preferably about 15%.

The graft segment ordinarily constitutes from 10–40% by weight of the total graft copolymer, preferably 10–35%. The number average molecular weight of the graft segment will range from 2,000–20,000.

The A segment or backbone of the graft copolymer should have a solubility parameter value of 7 to 12. Proper maintenance of a solubility parameter gradient between the backbone and graft segment results in unique stability of the polymer.

The solubility parameter is a physical constant which can be used to characterize any given polymer[1] or organic solvent[2] which may be used in a dispersion of such polymer. The solubility parameter of various solvents and resins can be calculated from various formulae. One of the simplest of these formulae is $$\text{Solubility parameter of a substance} = \sqrt{\frac{(\text{Heat of vaporization}) \times (\text{density})}{\text{Molecular weight}}}$$

Knowledge of the solubility parameter for a given copolymer and solvent or solvent blend enables one to accurately predetermine whether or not a suitably stable dispersion can be created from these parameter characterized components.

Proper solubility parameter balance between the backbone and graft segment of the copolymer used in the system is important. To achieve maximum stability, the solubility parameter of the backbone (determined as an entity) should differ from that of the continuous phase and the graft segment (determined as an entity). The solubility parameter of the graft segment and continuous phase should be similar to achieve maximum stability.

It should be noted that solubility parameter of the backbone or graft polymer entity is a single value. This value is obtained as a result of a single algebraic relationship based on the solubility parameter of the monomers which form the polymeric entity and the ratio of the monomers to the total monomeric composition of the entity.

A solubility parameter gradient between the backbone segment of the graft copolymer and the graft segment or continuous phase should be about 8 parameter units, for an acceptable dispersion stability preferably 5 to 7 units. A solubility parameter difference of less than 2.0 units will lead to dispersions of markedly reduced stability.

The solubility parameter of the backbone segment of the copolymer should be from about 7.0 to 12.0 parameter units with a range of about 8.0 to 10.5 parameter units being preferred.

The solubility parameter of the graft segment can be about 12 to 22 parameter units preferably 14 to 18 parameter units.

The continuous phase (everything in a liquid state) is generally comprised of a solvent or solvent blend and any plasticizers that are included in the dispersion. The solubility of the continuous phase can be about 12–22 parameter units, preferably 14–18 parameter units. This coincides with the aforementioned range of the graft segment.

Virtually any water miscible organic solvent could function as part of the continuous phase irrespective of its individual solubility parameter, so long as the solubility parameter of the total continuous phase falls within the prescribed limits. Each component of the continuous phase contributes to the solubility parameter of the continuous phase per se. The degree of contribution is in direct proportion to the solubility parameter of the individual solvent and the amount of said solvent that is used.

Water miscibility of the blend of solvents used for the continuous phase is necessary. A continuous phase where the solvents are not water miscible could lead to a form of instability commonly called coacervation. It should be pointed out however that in a multi component solvent there could be an immiscible pair of solvents; however, they could become miscible in the presence of a third solvent, a so-called "bridging solvent." In such an instance, the solubility parameter of the total continuous phase would still fall within the prescribed limit.

Solvents that are not at least 25% soluble by volume in water are undesirable in this invention. Solvents exhibiting partial solubility in water (below 25%) can be tolerated so long as they do not adversely affect the aforemen- ---
[1] "Solubility Parameters for Film Formers," H. Burrell, Official Digest, Federation Paint and Varnish Production Clubs, Oct. 27, 1955, pp. 726–758.
[2] "A Solvent Formulating Chart," H. Burrell, Official Digest, Federation Paint and Varnish Production Clubs, Nov. 29, 1957, pp. 1159–1173; and, "New Values of the Solubility Parameters From Vapor Pressure Data," K. L. Hoy, Journal of Paint Technology, 42, No. 541, 76 (1970).
Since the heat of vaporization is a factor directly influencing the solubility parameter value, the solubility parameter is a value which is absolute and takes into account all the physical forces acting on any specific polymer.

tioned solubility parameter limitations. Illustrative of solvents that are infinitely soluble in water are:

| | Solubility parameter |
|---|---|
| Actone | 9.6 |
| Butyl Carbitol (diethylene glycol monobutyl ether) | 9.8 |
| Butyl Cellsolve (ethylene glycol monobutyl ether) | 9.9 |
| Carbitol acetate (diethylene glycol monobutyl ether acetate) | 9.5 |
| Carbitol solvent (diethylene glycol monoethyl ether) | 10.3 |
| Cellosolve solvent (ethylene glycol monoethyl ether) | 10.7 |
| Diacetone alcohol | 10.2 |
| Diethyl Carbitol (diethylene glycol diethyl ether) | 8.7 |
| Methanol | 14.5 |
| Methyl Carbitol (diethylene glycol monomethyl ether) | 11.2 |
| Methyl Cellosolve (ethylene glycol monomethyl ether) | 11.7 |
| Methyl Cellosolve acetate (ethylene glycol monomethyl ether acetate) | 9.9 |
| Isopropanol | 11.5 |
| Ethanol | 12.8 |

Preferred compositions of this invention are graft copolymers having a backbone of methylmethacrylate/butyl methacrylate/allyl methacrylate in a 69/15/1 ratio by weight to the total copolymer and a backbone of hydroxy propyl methacrylate or hydroxy propyl methacrylate/acrylic acid in ratios to the total copolymer of 15 or 12/3 respectively.

Preparation

The graft copolymers of this invention are prepared by conventional solution polymerization techniques that are well known and widely used in the art. However, to achieve compatibility with water, the polymerization should be carried out in a solvent or solvent blend that is infinitely water soluble.

In order to invert the graft copolymer from the solution phase in which it is formed to a dispersion, a 50/50 mixture of water and isopropanol is used. Sufficient amounts of this mixture should be added until the proper solubility parameter value and desired percent solids content are achieved.

Utility

The graft copolymers of this invention have particular utility as coating compositions. Pigments, metallics, plasticizers, and dispersants can be admixed to produce excellent lacquer finishes for automobiles, appliances, furniture, and the like.

The use of water in the dispersion substantially cuts down the amount of volatile solvents emitted into the atmosphere by present paint application procedures. This advantage has obvious merit in view of the ecology situation. The use of water is also desirable due to its low cost and minimal toxicity. These dispersions have unique stability and wide formulation latitude. Unusually large amounts of solvent can be added without irreversibly precipitating the polymer thereby ruining the composition. The absence of surfactants makes these coating compositions foam free which enables one to apply higher quuality films free from pin holing.

Useful enamel finishes can be prepared from these dispersions by adding some water miscible amino resin cross linker. Melamine formaldehyde is an effective cross linker in amounts of 10 to 40% based on the weight of the copolymer, preferably about 10 to 30%.

Coating compositions prepared from the dispersions of this invention can be applied using conventional application techniques such as spraying, brushing, dipping and the like. A thermal cure at about 300° F. can be used to set films of these compositions and effectuate curing in the case of enamels.

Description of the Preferred Embodiments

The following examples illustrate the various aspects of the invention in greater detail. However, it should be recognized that they are only illustrative. Variations from what is disclosed will undoubtedly occur to those skilled in the art, but will nevertheless be embraced by the inventive concept of the invention. All parts unless otherwise indicated are by weight.

EXAMPLE 1

A water base dispersion of a graft copolymer having a backbone of a 70/14/1 ratio by weight of graft copolymer of methyl methacrylate/butyl methacrylate/allyl methacrylate and a graft segment having a 10/5 ratio by weight of graft copolymer of hydroxyethyl acrylate/acrylic acid was prepared by:

(1) Adding to a reflux flask:

700 parts methyl methacrylate
140 parts butyl methacrylate
10 parts allyl methacrylate
350 parts anhydrous isopropyl alcohol
75 parts ethylene glycol monobutyl ether
117 parts butyl alcohol and heating this mixture to reflux.

(2) A mixture of:

3 parts Vazo initiator (azobisisobutyronitrile)
12 parts anhydrous isopropyl alcohol
3 parts butyl alcohol was added to the mixture of (1) and the resultant mixture heated to reflux.

(3) A mixture of:

1.5 parts Vazo initiator (azobisisobutylronitrile)
7 parts anhydrous isopropyl alcohol
3 parts butyl alcohol was added to the mixture of (2) and the resultant mixture allowed to cool to 87° C.

(4) A mixture of:

103 parts 2-hydroxyethyl acrylate
50 parts acrylic acid
49 parts anhydrous isopropyl alcohol
16 parts butyl alcohol
1.5 parts Lupersol II (75% tertiary butyl peroxy pivalate in mineral spirits)

was added to the mixture of (3) and the mixture heated at about 87° C. for about 1 hour.

(5) 15 parts of anhydrous isopropyl alcohol and 0.8 part of Lupersol II were then added to the mixture of (4) with cooling to about 77° C. followed by another addition of 15 parts anhydrous isopropyl alcohol and 0.4 part Lupersol II (described above).

(6) 134 parts anhydrous isopropyl alcohol were added to the mixture of (5) followed by 500 parts of demineralized water to produce the water based dispersion.

EXAMPLE 2

A water base dispersion of a graft copolymer having a backbone of a 70/14/1 ratio (by weight of the graft copolymer) of methyl methacrylate/butyl methacrylate/allyl methacrylate and a graft segment of a 15 ratio by weight of 2-hydroxyethyl acrylate was prepared in accordance with the procedure of Example 1 except that the addition made in step 4 was modified so that 155 parts of 2-methyl methacrylate, 130 parts anhydrous isopropyl alcohol, and 1.5 parts of Lupersol II were substituted for the original add as made in Example 1 step (4).

EXAMPLE 3

A water base dispersion of a graft copolymer having a backbone of a 59/25/1 ratio (by weight of graft copolymer) of methyl methacrylate/butyl methacrylate/allyl methacrylate and a graft segment of a 15 ratio by weight of hydroxy propyl methacrylate was prepared by:

(1) Adding to a reflux flask:

2,006 parts methyl methacrylate
850 parts butyl methacrylate
34 parts allyl methacrylate
119 parts acetone
2,312 parts n-propyl alcohol
340 parts ethylene glycol monobutyl ether.

This mixture was then heated to reflux.

(2) To the mixture of (1) was added:

14.6 parts of Vazo initiator (azobisisobutyronitrile)
51.0 parts n-propyl alcohol
while reflux was maintained.

(3) To the resultant mixture of step (2) was added:

7.5 parts Vazo initiator (azobisisobutyronitrile)
34.0 parts n-propyl alcohol
following by another addition of:
3.7 parts Vazo initiator (azobisisobutyronitrile)
34.0 parts n-propyl alcohol and the resultant mixture allowed to cool.

(4) To the resultant mixture of step (3) a mixture of 530 parts of a 96% composition of hydroxy propyl methacrylate, with 3% acrylic acid and 1% of the dimers of hydroxy propyl methacrylate and methacrylic acid; 100 parts acetone; 342 parts n-propyl alcohol and 5.1 parts benzoyl peroxide. This mixture was maintained at reflux temperature followed by an addition of 34 parts acetone and 2.7 parts of benzoyl peroxide.

(5) To the resultant mixture of step (4) was added an additional 34 parts of acetone, 2.4 parts of benzoyl peroxide while reflux was maintained. Heating was then discontinued and 1700 n-propyl alcohol was added to the mixture. This resin will yield a water based dispersion upon admixture with the ionized water, thereby demonstrating the inversibility of such a system.

EXAMPLE 4

A water base dispersion of a graft copolymer having a backbone of a 69/21/1 ratio (by weight of the total copolymer) of methyl methacrylate/butyl methacrylate/allyl methacrylate and a graft segment of a 6/3 ratio by weight of hydroxy propyl methacrylate acrylic acid was prepared by:

(1) Adding to a reflux flask:

690 parts methyl methacrylate
210 parts butyl methacrylate
7 parts allyl methacrylate
30 parts acetone
645 parts n-propyl alcohol
200 parts ethylene glycol monobutyl ether.

This mixture was heated to reflux.

(2) Upon termination of the heating the mixture of step (1), 0.3 part Vazo initiator (azobisisobutyronitrile) and 15 parts n-propyl alcohol was added to the resultant mixture of step (1). This was followed by an additional add of 2.2 parts of Vazo initiator (azobisisobutyronitrile), and 10 parts of an n-propyl alcohol.

(3) The resultant mixture of step (2) was then heated and maintained at reflux followed by the addition of 1.1 parts of Vazo initiator (azobisisobutyronitrile) and 10 parts n-propyl alcohol.

(4) To the resultant mixture of step (3) at reflux was incrementally added a mixture of 63 parts of a 96% composition of hydroxy propyl methacrylate having 3% methacrylic acid, and 1% of the dimers of hydroxy propyl methacrylate and methacrylic acid; 30 parts of acrylic acid; 10 parts acetone; 90 parts n-propyl alcohol, and 0.9 part benzoyl peroxide.

(5) To the resultant mixture at reflux of step (4) was added: 10 parts acetone and 0.45 part benzoyl peroxide, followed by a subsequent addition of: 10 parts acetone and 0.23 part benzoyl peroxide.

(6) Heating the resultant mixture of step (5) was stopped and a mixture of 372 parts anhydrous isopropyl alcohol and 932 parts of demineralized water were added to the resultant mixture of step (5) to produce an excellent water base dispersion.

EXAMPLE 5

The dispersions produced in Examples 1 through 4 could be made into excellent automotive finishes by the inclusion of colored pigments, aluminum mill bases and suitable plasticizers.

What is claimed is:

1. An entropically stabilized graft copolymer having the general structure A–B where A is the backbone segment and B is the graft segment, said A segment being an interpolymer further represented by the structure $a$–$b$, where $a$ is composed of monomer units having the general structure

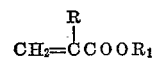

where R is H, $CH_3$, or $—CH_2CH_3$, and $R_1$ is an alkyl or cycloalkyl group of 1–18 carbon atoms,
where $b$ is composed of monomer units having the general formula

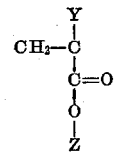

where Y is hydrogen, $—CH_3$ or $—CH_2CH_3$; Z is

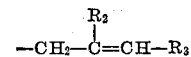

where $R_2$ and $R_3$ are Y, the B segment is comprised of from 70 to 100% by weight of water soluble hydroxy monomers selected from the group consisting of hydroxyethyl acrylate, hydroxyethyl methacrylate, hydroxypropyl methacrylate, hydroxypropyl acrylate, hydroxybutyl acrylate, and hydroxybutyl methacrylate and from 0 to 30% by weight of monomers having the general structure

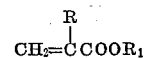

where R is H, $CH_3$ or $—CH_2CH_2$ and $R_1$ is an alkyl or cycloalkyl group of 1–18 carbon atoms.

2. The graft copolymer of claim 1 wherein the $a$ segment forms from 85 to 100% by weight and the $b$ segment forms from 0 to 15% by weight of the A segment, said A segment comprising from 60 to 90% by weight of the total A–B graft copolymer and the B segment comprising from 10 to 40% by weight of the total graft copolymer.

3. The graft copolymer of claim 2 wherein the A segment has a molecular weight (number average) of from 10,000 to 200,000 and a solubility parameter value of from 7 to 12 and wherein the B segment has a molecular weight of from 2,000 to 20,000 (number average) and a solubility parameter value of from 12 to 22.

4. The graft copolymer of claim 3 wherein there is a solubility parameter gradient of 5 to 7 parameter units between the A and B segments and wherein the $b$ segment comprises from 0.2 to 5% by weight of the A segment, said A segment comprising from 70 to 80% by weight of the graft copolymer, the B segment comprising from 10 to 35% of said graft copolymer and the water soluble hydroxy acrylic monomers comprising from 7 to 40% by weight of said graft copolymer.

5. The graft copolymer of claim 4 wherein the A segment is a methylmethacrylate/butyl methacrylate/allyl methacrylate copolymer in a 69/15/1 ratio by weight to said graft copolymer and the B segment is hydroxy propyl methacrylate/acrylic acid in a 12/3 ratio by weight to the total copolymer.

6. A coating composition comprising the graft copolymer of claim 1, a solvent or solvent blend selected from the group consisting of water and water miscible organic solvents, said solvent blend having a solubility parameter value of from 12 to 22, pigments, metallics and plasticizers.

7. A coating composition comprising the graft copolymer of claim 2, a solvent or solvent blend selected from the group consisting of water and water miscible organic solvents, said solvent blend having a solubility parameter value of from 12 to 22, pigments, metallics and plasticizers.

8. A coating composition comprising the graft copolymer of claim 3, a solvent or solvent blend selected from the group consisting of water and water miscible organic solvents, said solvent blend having a solubility parameter value of from 12 to 22, pigments, metallics and plasticizers.

9. A coating composition comprising the graft copolymers of claim 4, a solvent or solvent blend selected from the group consisting of water and water miscible organic solvents, said solvent blend having a solubility parameter value of from 12 to 22, pigments, metallics and plasticizers.

10. A coating composition comprising the graft copolymer of claim 5, a solvent or solvent blend selected from the group consisting of water and water miscible organic solvents, said solvent blend having a solubility parameter value of from 12 to 22, pigments, metallics and plasticizers.

References Cited

UNITED STATES PATENTS

| | | | |
|---|---|---|---|
| 3,037,948 | 6/1962 | Landler et al. | 260—4 |
| 3,311,583 | 3/1967 | Bearden | 260—29.6 |
| 3,485,777 | 12/1969 | Gaylord | 260—17.4 |
| 3,505,256 | 4/1970 | Duffy et al. | 260—22 |

HAROLD D. ANDERSON, Primary Examiner

E. A. NIELSEN, Assistant Examiner

U.S. Cl. X.R.

117—132 C, 161 UT; 260—29.4 UA, 129.6 RW, 32.8 R, 33.2 R, 33.4 R, 885